United States Patent [19]

Mizutani et al.

[11] Patent Number: 4,463,153
[45] Date of Patent: * Jul. 31, 1984

[54] HEAT SHRINKABLE FILM AND PROCESS FOR PREPARING THE SAME

[75] Inventors: Tomoji Mizutani; Hitoshi Fukushima; Yoshihiro Sakamoto, all of Yatsushiro, Japan

[73] Assignee: Kohjin Co., Ltd., Tokyo, Japan

[ * ] Notice: The portion of the term of this patent subsequent to Oct. 19, 1999 has been disclaimed.

[21] Appl. No.: 350,376

[22] Filed: Feb. 19, 1982

Related U.S. Application Data

[63] Continuation of Ser. No. 177,185, Aug. 11, 1980, Pat. No. 4,354,997.

[30] Foreign Application Priority Data

Aug. 20, 1979 [JP] Japan ................................ 54-105067

[51] Int. Cl.$^3$ ............................................... C08J 5/18
[52] U.S. Cl. ................................................. 526/348.1
[58] Field of Search ............... 526/348.1, 348.2, 348.3, 526/348.4, 348.5, 348.6; 264/290.2, 289.6

[56] References Cited

U.S. PATENT DOCUMENTS

| | | | |
|---|---|---|---|
| 3,022,543 | 2/1962 | Baird | 18/57 |
| 3,299,194 | 1/1967 | Golike | 264/290.2 |
| 3,383,445 | 5/1968 | Gebler | 264/290.2 |
| 3,465,072 | 9/1969 | Gregorian | 264/564 |
| 3,509,116 | 4/1970 | Cote | 526/348.6 |
| 3,891,737 | 6/1975 | Marsh | 264/289.6 |
| 4,192,935 | 3/1980 | Lovell | 526/348.2 |
| 4,205,021 | 5/1980 | Morita | 526/348.2 |
| 4,226,905 | 10/1980 | Harbourne | 526/348.1 |
| 4,258,166 | 3/1981 | Canterino | 526/348.1 |
| 4,311,752 | 1/1982 | Diedrich | 526/348.1 |

FOREIGN PATENT DOCUMENTS 938766 10/1963 United Kingdom ............. 264/289.6

*Primary Examiner*—Paul R. Michl
*Attorney, Agent, or Firm*—Armstrong, Nikaido, Marmelstein & Kubovcik

[57] ABSTRACT

A process for simultaneously, biaxially orienting tubular ethylene polymer film by expansion and extension of the tube under particular conditions for heating the expanding tube, to give a heat skrinkable film. The heat shrinkable film has excellent heat shrinkability, shrinkage stress, transparency, heat sealability and impact resistance, and is very suited for use in shrink packaging.

4 Claims, 2 Drawing Figures

HEAT SHRINKABLE FILM AND PROCESS FOR PREPARING THE SAME

This is a continuation, of application Ser. No. 177,185, filed Aug. 11, 1980, now U.S. Pat. No. 4,354,997.

BACKGROUND OF THE INVENTION

The present invention relates to a heat shrinkable film prepared by a tubular process from an ethylene polymer and a process for preparing the same.

Hitherto, a polyvinyl chloride film, a polypropylene film and a polythylene film are known as heat shrinkable films.

A heat shrinkable polyvinyl chloride film has an excellent characteristic such that it shows a good shrinkability at a relatively low temperature, e.g. in the vicinity of 100° C., but has the disadvantages that an additive such as a plasticizer or a heat stabilizer added to the resin may cause a hygienic problem and also that the film generates hydrogen chloride upon the destruction treatment by fire of the used film.

A heat shrinkable polypropylene film has a good heat shrinkability because of being subjected to biaxial stretching, but has the disadvantages that it reveals only at a relatively high temperature of 100° to 140° C. and also that the heat seal strength is not so large.

On the other hand, a heat shrinkable film made of ethylene polymers such as a polyethylene shrinkable film has been widely employed in shrink packaging, since it is inexpensive and has a large heat seal strength. The heat shrinkable polyethylene film has been prepared by a so-called inflation process which is one of tubular processes and in which a molten tube extruded from a die is blown-up as it is by the process of an internal gas. In such a conventional process, an effective molecular orientation does not take place, and, therefore, a known heat shrinkable film of ethylene polymers has not always satisfactory characteristics. For instance, the film strength is small and the elongation is large. Also, the film shows a high heat shrinkage percent at a temperature near the melting point of the polymer, but the heat shrinkable temperature range is narrow, and also the close adhesion of the film to articles to be wrapped is not sufficient due to small shrinkage stress. Although it is theoretically clear that the mechanical properties of the film are improved by stretching the film, it has been considered to be difficult to highly stretch a film of ethylene polymers by conventional processes so as to impart the heat shrinkability to the film.

In order to eliminate the disadvantages of heat shrinkable polyethylene films, there are proposed a process as disclosed in Japanese Patent Publication Nos. 18893/1962 and 9086/1964 in which a polyethylene film is irradiated with ionizing radiation so as to cause intermolecular crosslinking and then stretched with heat, and a process as disclosed in Japanese Patent Publication No. 20432/1973 in which a resin irradiated with radiation or a mixture of resins containing the irradiated resin is subjected to the formation of film followed by stretching. However, these processes have the disadvantages that the radiation treatment increases the cost, and that the heat sealability of the film is bad, and that it is impossible to recover the waste film. Also, a low density polyethylene shrinkable film is poor in transparency.

Accordingly, it is an object of the present invention to provide a heat shrinkable film of ethylene polymers which can reveal an excellent heat shrinkability and a large shrinkage stress.

A further object of the invention is to provide a heat shrinkable film suited for use in shrink wrapping, which can closely adhere to articles to be wrapped and which has excellent transparency, heat sealability and impact resistance.

Another object of the invention is to provide a process for preparing a heat shrinkable ethylene polymer film having excellent heat shrinkability and shrinkage stress by means of biaxial stretching.

These and other objects of the present invention will become apparent from the description hereinafter.

SUMMARY OF THE INVENTION

Figure 1:
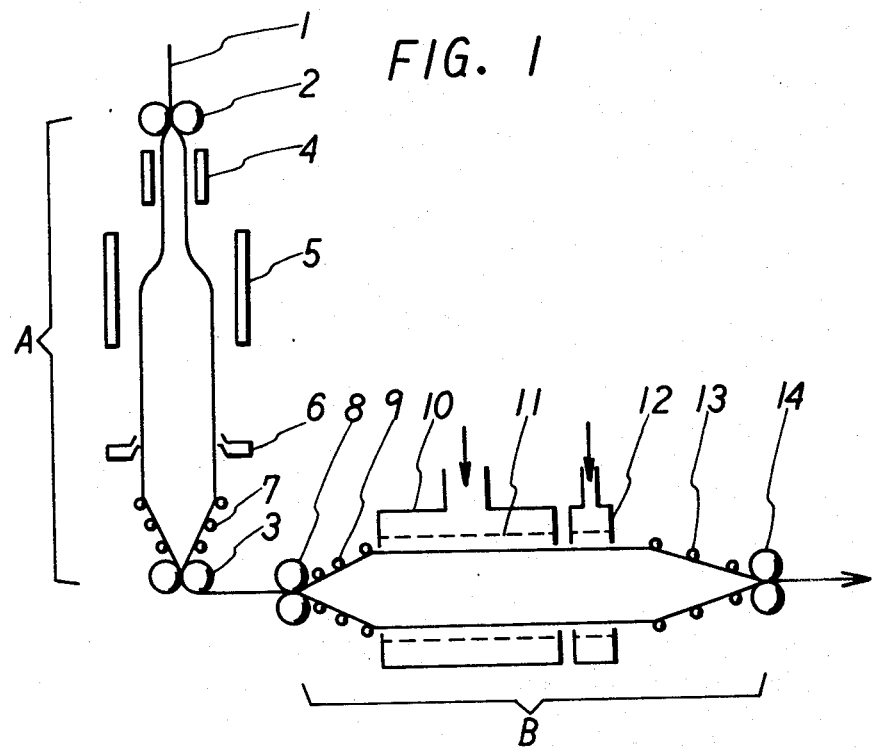
FIGS. 1 and 2 are illustrative section views showing an embodiment of practicing the process of the present invention.

In accordance with the present invention, there is provided a process for preparing a heat shrinkable ethylene polymer film which comprises the steps of (1) introducing a non-stretched tubular film of an ethylene polymer having a density of 0.91 to 0.93 g./cm.$^3$ at 25° C. into a tubular biaxial stretching apparatus, a film obtained by melt-extruding said ethylene polymer and cooling the extrudate to solidify without stretching it showing a tensile strength at 300% elongation of not less than 15 kg./cm.$^2$ at a temperature of 15° C. below the melting point of said ethylene polymer, (2) biaxially stretching said non-stretched tubular film to give a biaxially oriented film by means of an internal gas pressure at a temperature within the orientable temperature range under the following conditions:
- (a) the surface temperature of the film at a starting point of expansion being within the range of 15° to 25° C. below the melting point of the polymer,
- (b) the film in a stretching zone extending from the starting point to a finishing point of expansion having a temperature gradient such that the surface temperature of the film at a position of $\frac{1}{4}$ to $\frac{3}{8}$ the length of the stretching zone from the starting point is maximum, and the difference between the maximum surface temperature of the film at the starting point being not more than 5° C.,
- (c) the temperature drop of the film from the maximum temperature position to the finishing point being within the range of 15° to 20° C., and
- (d) the film being cooled while traveling from the finishing point to a distance of 1.0 to 1.5 times the vertical distance of the stretching zone so that the surface temperature of the film drops by 30° to 40° C., and (3) recovering the resulting biaxially oriented film.

The biaxially oriented ethylene polymer film so obtained has an excellent heat shrinkability and a large shrinkage stress, and is very suitable for use in shrink wrapping. Thus, the present invention also provides a heat shrinkable ethylene polymer film having a heat shrinkage percent of not less than 25% and a heat shrinkage stress of not less than 12 kg./cm.$^2$, respectively at a temperature of 15° C. below the melting point of the ethylene polymer.

DETAILED DESCRIPTION

A polyethylene film is essentially superior in characteristics such as heat sealability and impact resistance to a polypropylene film and a polyvinyl chloride film. Particularly, the strength of a heat sealed portion of the polyethylene film after wrapping is large, and this is very useful for shrink packaging of heavy articles. It is very significant that the defect of a conventional heat shrinkable polyethylene film, i.e. poor heat shrinkability, has been improved by the invention without losing the above advantageous characteristics. The heat shrinkable ethylene polymer film of the invention has also the feature that the transparency is superior to that of a conventional polyethylene film.

An ethylene polymer employed in the present invention as a raw material of non-stretched tubular film is a low density polymer having a density of 0.91 to 0.93 g./cm.$^3$ at 25° C. The ethylene polymer is selected from homopolymers of ethylene (the ethylene homopolymer being hereinafter referred to as "polyethylene") such as low density polyethylene and linear low density polyethylene and copolymers of ethylene as a main component and an α-olefinically unsaturated monomer. In case of the copolymers, there are preferred copolymers containing not more than 25% by weight of an α-olefin having 3 to 12 carbon atoms, particularly not more than 15% by weight of an α-olefin having 4 to 6 carbon atoms. The reason that these copolymers are preferred is that the copolymers provide a non-stretched film which is more suited for use in the process of the present invention as compared with polyethylene and also provide a stretched film excellent particularly in impact strength, impact strength of beads sealed portion, bar heat seal strength and impact strength of bar heat sealed portion. It is essential that a non-stretched tubular film obtained by melt-extruding an ethylene polymer and cooling the extrudate to solidify it without stretching, that is, a film obtained by melt-blending an ethylene polymer at a temperature of 200° to 250° C., extruding downward the molten mass through a circular die having a slit of 75 mm. in diameter maintained at 250° C. and cooling the outside of the tube with water to give a tubular film of 66 mm. in diameter and 190 μm. in thickness, shows a tensile strength at 300% elongation of not less than 15 kg./cm.$^2$ at a temperature of 15° C. below the melting point of the ethylene polymer. Any ethylene polymers having the above characteristics are usable as a raw material of the non-stretched tubular film to be oriented biaxially according to the process of the present invention.

One of the reasons that biaxial stretching of polyethylene has been considered to be difficult is generally that the tensile strength of the film in the stretching zone is weak and the stable stretching cannot be made. The present inventors have overcome difficulties involved in conventional processes and succeeded in conducting the stable stretching by combination of use of the above-mentioned particular ethylene polymer as a raw material with particular stretching conditions mentioned below. When polymers other than the above-mentioned particular ethylene polymers are employed as raw materials, stable stretching is impossible even by conducting according to the process of the present invention and no desired heat shrinkable film is obtained.

According to the process of the present invention, ethylene polymer films showing a high shrinkage percent and a large shrinkage stress at a relatively low temperature can be prepared by simultaneous expansion and extension of a tube in the orientation temperature range capable of causing an effective high orientation of the film by means of a tubular process so as to simultaneously, biaxially orient the film.

Non-stretched tubular ethylene polymer films prepared by melt-extruding in tubular form and cooling the tubular film to solidify it according to known processes are employed as starting ethylene polymer films in the present invention.

The orientable temperature range of the ethylene polymer changes depending on its melting point. Therefore, effective orientation and progress of uniform and stable stretching cannot be desired, if the temperature of the film at a starting point of expansion and the temperature gradient of the film in a stretching zone are not exactly set upon expansion and extension of the tube.

In the process of the invention, it is the most preferable that the film temperature at the starting point of expansion falls within the range of 15° to 25° C. below the melting point of the ethylene polymer. When the film temperature at the starting point is higher than the above range, the strength of the film in the neighborhood of the starting point of expansion is weak, and not only the bubble becomes easy to rupture at that portion, but also it brings about lowering of the internal pressure of the bubble and in its turn lowering of the stretching tension, and as a result, the effects produced by stretching and the strength and shrinkage percent of the stretched film are decreased. On the other hand, when the film temperature at the starting point of expansion is lower than the above range, the internal pressure of the bubble and in its turn the stretching tension become too large, and there is increased the frequency of the break of the film, i.e. the puncture of the bubble. Even if the film is not broken, it becomes in the state of the so-called neck stretching and the surface of the film roughens, resulting in the increase of unevenness in film thickness and the decrease of the transparency.

The present inventors have also found that it is optimum to carry out the expansion and extension of the tubular film with a temperature gradient such that the film in a stretching zone extending from the starting point of expansion to a finishing point of expansion reaches the maximum temperature at the position of ¼ to ⅝ the length of the stretching zone from the starting point, the difference between the maximum temperature and the temperature of the film at the starting point is not more than 5° C., and the temperature drop of the film from the maximum temperature position to the finishing point is in the range of 15° to 20° C. Thus, in the present invention a strict temperature control of the film is necessary. The temperature gradient in the stretching zone has a great influence on the stretching stability and the physical properties of the stretched film.

When the temperature gradient during travelling of the film from the starting point of expansion to the position of ¼ to ⅝ the length of the stretching zone is a downward gradient, the stability of the expanding bubble is increased, but well-balanced stretching in the machine and transverse directions cannot be conducted. This not only results in unevenness in thickness, but also is easy to cause a great unbalance in shrinkability of the stretched film, and also the transparency is lowered.

Also, when the temperature gradient during this period is more than 5° C., the temperature of the film approaches to the melting point of ethylene polymer, and as a result, the tensile strength and elongation of the film become small and the transverse sway of the bubble and in its turn rupture of the bubble are increased.

The bubble can be prevented from becoming unstable by suddenly dropping the temperature of the film by 15° to 20° C. below the maximum temperature while the film travels from the maximum temperature position to the finishing point of expansion. The lack of the temperature drop during this period causes not only instability and frequent rupture of the bubble and unevenness in film thickness, but also lowering of the heat shrinkability and shrinkage stress of the stretched film. On the other hand, when the temperature drop is more than the above range, the internal pressure of the bubble abnormally increases and the stability in the neighborhood of the strating point of expansion is broken, so the upper portion of the bubble sways and the rupture of the bubble increases in the upper portion.

It has also been found that the stretchings can be the most stably conducted when the temperature gradient of the film is further maintained so that while the film travels from the finishing point of expansion to a distance of 1.0 to 1.5 times the vertical distance of the stretching zone, the temperature of the film drops within 30° to 40° C. of the temperature of the finishing point of expansion at which the film reaches its maximum diameter, in addition to the above-mentioned temperature gradient of the film in the stretching zone. The temperature gradient durng this period is also important for the stability of stretching as well as the temperature gradient in the stretching zone. When the temperature drop is insufficient, the sway of the whole bubble occurs and the unevenness in thickness of the stretched film becomes large, and in extreme case, the rupture of the bubble may take place. Also, when the temperature drop is too steep, the stability in the neighborhood of the starting point of expansion becomes poor and the upper portion of the bubble transversely sways.

By maintaining strictly the temperature gradient as mentioned above, it has now become possible to conduct stable stretching of ethylene polymers which has not been able to be attached by conventional processes, and also the obtained film has a good transparency and uniform thickness. The biaxially stretched film drawn out of a stretching apparatus may be annealed, as occasion demands. A proper annealing temperature is from 55° to 85° C.

It is not necessary to stretch the film in the same ratio in both the machine and transverse directions. However, in order to obtain the film having good physical properties, it is desirable to stretch the film in a stretching ratio of at least 2.5 in each of the machine and transverse directions.

The heat shrinkable film of the present invention has improved heat shrinkability and heat shrinkage stress as compared with blown films of a polymer of the same kind. Conventional heat shrinkable films of ethylene polymers require a particular heating condition in heat shrinking, since they must be heated to near the melting point. However, the heat shrinkable film of the invention can be very easily applied to shrink wrapping by employing a generally used oven for heat shrinkable polypropylene film such as a tunnel oven. Also, the film of the invention is usable at wrapping temperatures of wide range because of having a high heat shrinkage percent at relatively low temperatures, and accordingly is of very wide application.

The heat shrinkable film of the invention also has an improved transparency. While the haze of conventional shrinkable films of low density polyethylene are more than 10%, the haze of the film of the invention is less than about 8% and in a preferable embodiment is at most about 5%. The breaking strength of the film of the invention is improved to more than 2 times that of conventional shrinkable films, and also the film of the invention has improved impact strength, heat seal strength and impact strength of sealed portion. Therefore, half thickness is sufficient as compared with conventional shrinkable films in case of using with the same object, and accordingly the present invention has a large effect on saving resources. Also, the resistance to film breaking by an external force after wrapping can be remarkably increased.

The heat shrinkable film of the present invention is suitably employed for shrink packaging, and is particularly suitable for assembly packaging of angular, heavy or beautiful articles such as bottle, can, welding rod, sash, tool, parts, toy, stationary, book, magazine, drapery and plywood.

The present invention is more specifically described and explained by means of the following Examples, in which data are those measured according to the following methods.

1. Heat shrinkage percent

A film having a size of 10 cm. × 10 cm. is immersed in glycerin at a prescribed temperature for 10 seconds, the length (A cm.) of a side is measured after immersion and the heat shrinkage percent is calculated according to the following equation.

$$\text{Heat shrinkage percent} = \frac{10 - A}{10} \times 100$$

2. Heat shrinkage stress

The shrinkage stress is measured according to ASTM 2838-69.

3. Tensile strength at 300% elongation

By employing Tensilon tensile strength tester equipped with an oven made by Toyo-Baldwin Co., a film sample is placed in the oven for five minutes and is then elongated at a rate of 300 mm./min., and the tensile strength is measured when the elongation reaches 300%.

4. Melting point

By employing a micro melting point apparatus (No. 2544 type made by Shimadzu Corporation), a film sample having a size of 2 mm. × 2 mm. and a thickness of about 0.2 mm. is heated at a rate of 2° C./min. and the melting point is measured by determining a point at which the transparency of the sample changes suddenly.

5. Surface temperature of film

By employing a surface thermometer to which a chromel-constantan thermocouple (4.5 ohms) having a diameter of about 1 mm. and a length of exposed portion of about 15 mm. is attached, the nose of the thermocouple is contacted with the surface of a film, and the value after 30 seconds is regarded as the surface temperature. In case that the radiant heat of a heat source is strong, one side of the thermocouple which does not contact with the film is covered with an aluminum foil to prevent its influence.

EXAMPLE 1

A low density polyethylene having a melting point of 111.5° C. and a density at 25° C. of 0.920 g./cm.$^3$ (commercial name "UBE Polyethylene HF 019" made by Ube Industries Ltd.) was melt-blended at a temperature of 200° to 250° C. and extruded downward through a circular die maintained at 250° C. The diameter of a slit of the circular die was 75 mm. and the slit gap was 0.8 mm. The extruded molten tubular film was cooled to room temperature by slidingly contacting the inside surface of the film with the outside surface of a cylindrical mandrel having an outer diameter of 66 mm. in which a cooling water of 20° C. was circulated and which was positioned just below the die, while passing the outside surface of the film through a water bath. The thus formed tubular non-stretched film had a diameter of about 66 mm. and a thickness of 190 μm. The tensile strength at 300% elongation at 95.5° C. (i.e. at a temperature of 15° C. below the melting point of the polyethylene) of the non-stretched film was 21 kg./cm.$^2$ As shown in FIG. 1, the non-stretched film so obtained was employed as a starting material 1, and was led to a biaxial stretching apparatus A to conduct expansion and extension.

The temperature of the film at an outlet of a preheater 4 was maintained at 65° C. by adjusting the voltage and current of a circular infrared heater of the preheater.

Eight circular infrared heaters of a main heater 5 were fallen into four divisions, and the voltage and current of each division were adjusted. The film was biaxially stretched 3 times in both the machine and transverse directions by the air pressure of a pressurized air admitt4ed into the tubular film between low-speed nip rolls 2 and high-speed nip-rolls 3 and the relative peripheral speeds of the low-speed and high-speed nip rolls 2 and 3 in an air stream flowing along the tube from a cooling air ring 6 positioned below the main heater 5.

Figure 2:
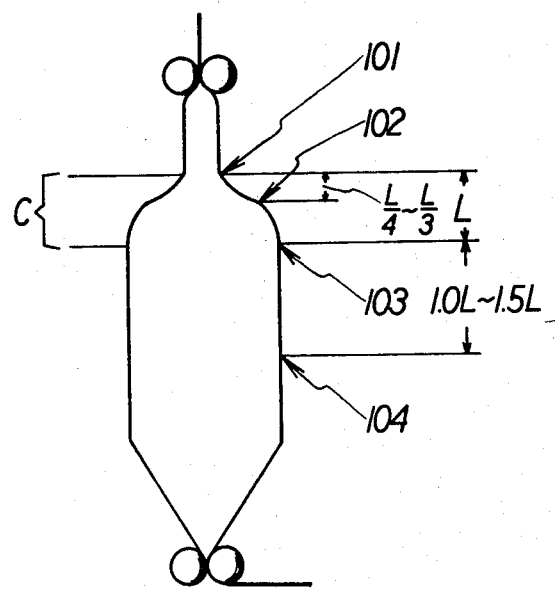

By the adjustment of the voltage and current of the divided circular infrared heaters of the main heater 5 and the adjustment of the flow rate and temperature of the air stream, the temperature of the film at each of positions as shown in FIG. 2 was maintained so that the temperature at a starting point of expansion 101 was 88° C., the temperature at a position 102 of about 1/3.5 the vertical distance L of a stretching zone C from the starting point 101 was 90° C. which was maximum temperature, the temperature at a finishing point of expansion 103 was 75° C. and the temperature at a position 104 located at a distance of 1.2 times the vertical distance L of the stretching zone from the finishing point 103 was 43° C. The vertical distance L of the stretching zone C extending from the starting point 101 to the finishing point 103 was about 210 mm., and the diameter of the bubble at the finishing point was 195 mm.

The thus stretched tubular film was then collapsed through collapser rolls 7 and the nip rolls 3 and drawn out of the stretching apparatus, and was then introduced into an annealing apparatus B through nip rolls 8. The flattened film was inflated again with air to the original tube state along rolls 9, and was annealed for 10 seconds by blowing a hot air of 75° C. to the tube from slits 11 of a heating cylinder 10 and was cooled to room temperature by a cooling cylinder 12. The cooled tube was collapsed again through a collapser rolls 13, drawn out of nip rolls 14 and wound up. During the above continuous operation, the bubble scarcely swayed and was stable without rupture of the bubble.

The obtained film had a thickness of 21 μm., shrinkage percentages at 96.5° C. of 26% in the machine direction and 28% in the transverse direction, and shrinkage stresses at 96.5° C. of 15 kg./cm.$^2$ in the machine direction and 15 kg./cm.$^2$ in the transverse direction.

Fifty polystyrene vessels having a height of 75 mm. and a maximum diameter of 40 mm. charged with a lactic acid beverage were arranged in ten rows and pre-wrapped in a lot with the film, and passed for 8 seconds through a commercially available tunnel oven with blowing of a hot air of 105° C. The film adhered closely to the vessels without wrinkle despite of uneven shape of the vessels, and showed a good transparency such that the prints and content of the vessels were clearly visible through the film. Also, the wrapping film was not torn from the sealed and other portions, even if one end of the film was grabbed up, and showed a sufficient strength for practical use.

EXAMPLE 2

A non-stretched tubular film having a diameter of 66 mm. and a thickness of 190 μm was prepared from a low density ethylene polymer having a melting point of 124° C. and a density of 25° C. of 0.923 g./cm.$^3$ (commercial name "Ultzex 2020L" made by Mitsui Petrochemical Industries, Ltd.) in the same manner as in Example 1 except that the inside of the extruded tubular film was cooled with air and the outside was cooled with water. The tensile strength at 300% elongation at 109° C. of the non-stretched film was 16 kg./cm.$^2$ The non-stretched film was biaxially stretched in the same manner as in Example 1 except that the temperature of the film at the outlet of the preheater 4 was 70° C., the temperature of the starting point was 100° C., the temperature at a distance 102 of ¼ the length L of the stretching zone from the starting point 101 was 102° C. (maximum temperature), the temperature at the finishing point 103 was 87° C., and the temperature at a distance 104 of 1.3 times the length L of the stretching zone from the finishing point 103 was 48° C. The vertical length L of the stretching zone was about 210 mm, and the maximum diameter of the bubble at the finishing point of expansion was 185 mm.

The operation was continued for 5 hours, but there was little sway of the bubble during the operation. The bubble was stable and did not rupture.

The stretched film was then annealed for 10 seconds by blowing a hot air of 70° C. in the same manner as in Example 1. The stretched film so obtained had a thickness of 21 μm, shrinkage percentages at 109° C. of 50% in the machine direction and 45% in the transverse direction, and shrinkage stresses at 109° C. of 22 kg./cm.$^2$ in the machine direction and 20 kg./cm.$^2$ in the transverse direction.

Five pieces of a round iron bar having a diameter of 12 mm. and a length of 20 cm. (total weight: about 1 kg.) were arranged in a row and pre-wrapped with the stretched film, and passed for about 8 seconds through a commercially available tunnel oven with blowing of a hot air of 105° C. The wrapping film adhered closely to the round bars and there was no wrinkle.

The fragility was observed by repeatedly dropping the packages to a floor from a height of 1 mm. Among 10 packages, 3 packages were broken in the second dropping. Of the remaining packages, 3 packages, 2 packages and the residual 2 packages were broken in the third, fourth and fifth droppings, respectively.

The same dropping test was carried out by employing the packages with a commercially available shrinkable polyethylene film (made by Okura Kogyo Co.) having a thickness of 40 μm. Among 10 packages, 7 packages were broken in the first dropping and the residual 3 packages were broken in the second dropping.

EXAMPLE 3

A non-stretched tubular film having a diameter of 66 mm. and a thickness of 190 μm. was prepared from a low density polyethylene having a melting point of 123° C. and a density at 25° C. of 0.923 g./cm.$^3$ (commercial name "Neozex 2006H" made by Mitsui Petrochemical Industries, Ltd.) in the same manner as in Example 1. The tensile strength at 300% elongation at 108° C. of the non-stretched film was 17 kg./cm.$^2$ The non-stretched film was biaxially stretched in the same manner as in Example 1 except that the temperature of the film at the outlet of the preheater 4 was 65° C., the temperature at the starting point 101 was 100° C., the temperature at the position 102 of ¼ the length L of the stretching zone from the starting point 101 was 104° C., the temperature at the finishing point 103 was 86° C. and the temperature at the position 104 of 1.2 times the length L of the stretching zone from the finishing point 103 was 48° C. The vertical length L of the stretching zone was about 230 mm., and the maximum diameter of the bubble at the finishing point of expansion was 210 mm.

There was little sway of the bubble during the stretching operation for 5 hours. The bubble was stable and did not rupture.

The stretched film was then annealed for 10 seconds by blowing a hot air of 80° C. in the same manner as in Example 1. The stretched film so obtained had a thickness of 19.8 μm., heat shrinkage percentages at 108° C. of 40% in the machine direction and 46% in the transverse direction, and shrinkage stresses at 108° C. of 19 kg./cm.$^2$ in the machine direction and 17 kg./cm.$^2$ in the transverse direction.

Three orange juice aluminum cans were arranged in a row and pre-wrapped with the stretched film, and passed for 12 seconds through a commercially available tunnel oven with blowing of a hot air of 110° C. The wrapping film adhered closely to the cans. The wrapping film was not torn from the sealed and other portions, even if one end of the package was grabbed up, and showed a sufficient strength for practical use.

EXAMPLE 4

A non-stretched tubular film having a diameter of 66 mm. and a thickness of 540 μm. was prepared from a copolymer of ethylene and 8.5% by weight of 4-methyl-1-pentene having a melting point of 123° C. and a density at 25° C. of 0.923 g./cm.$^3$ in the same manner as in Example 1. The tensile strength at 300% elongation at 108° C. of the non-stretched film was 18 kg./cm.$^2$ The non-stretched film was biaxially stretched in the same manner as in Example 1 except that the temperature of the film at the outlet of the preheater 4 was 80° C., the temperature at the starting point 101 was 103° C., the temperature at the position 102 of ¼ the length L of the stretching zone from the starting point 101 was 106° C., the temperature at the finishing point 103 was 87° C., and the temperature at the position 104 of 1.2 times the length L of the stretching zone from the finishing point 103 was 48° C. The vertical length L of the stretching zone was about 240 mm., and the maximum diameter of the bubble at the finishing point of expansion was 238 mm.

There was little sway of the bubble during the stretching operation for 5 hours, and the stretching operation was continued with stability.

The stretched film was then annealed for 10 seconds by blowing a hot air of 70° C. in the same manner as in Example 1. The stretched film so obtained had a thickness of 35 μm., heat shrinkage percentages at 108° C. of 48% in the machine direction and 45% in the transverse direction, and shrinkage stresses at 108° C. of 20 kg./cm.$^2$ in the machine direction and 25 kg./cm.$^2$ in the transverse direction.

A set of aluminum sash members consisting of 4 members of 17 mm. in thickness, 25 mm. in width and 550 mm. in length and 4 members of 17 mm. in thickness, 35 mm. in width and 430 mm. in length were arranged in three rows in three layers and pre-wrapped with the stretched film, and passed for about 5 seconds through a commercially available tunnel oven with blowing of a hot air of 130° C. Despite irregularity of the sash members to be wrapped due to a difference in length, the film adhered closely to the sash members and the sash members were tightly bound together.

EXAMPLE 5

A non-stretched tubular film having a diameter of 66 mm. and a thickness of 400 μm. was prepared from a copolymer of ethylene and 6.2% by weight of 1-butene having a density at 25° C. of 0.924 g./cm.$^3$ and a melting point of 122° C. in the same manner as in Example 1. The tensile strength at 300% elongation at 107° C. of the non-stretched film was 22 kg./cm.$^2$ The non-stretched film was biaxially stretched in the same manner as in Example 1 except that the temperature of the film at the outlet of the preheater 4 was 75° C., the temperature at the starting point 101 was 101° C., the temperature at the position 102 of ¼ the length L of the stretching zone from the starting point 101 was 105° C., the temperature at the finishing point 103 was 86° C., and the temperature at the position 104 of 1.2 times the length L of the stretching zone from the finishing point 103 was 48° C. The vertical length L of the stretching zone was about 230 mm., and the maximum diameter of the bubble at the finishing point 103 was 235 mm. The stretching was stably continued for about 3 hours.

The stretched film was annealed for 10 seconds by blowing a hot air of 70° C. in the same manner as in Example 1. The stretched film so obtained had a thickness of 25 μm., heat shrinkage percentages at 107° C. of 44% in the machine direction and 48% in the transverse direction and shrinkage stresses at 107° C. of 20 kg./cm.$^2$ in the machine direction and 22 kg./cm.$^2$ in the transverse direction.

Twenty copies of a B5 size notebook of 30 sheets were piled up and pre-wrapped with the stretched film, and passed for about 8 seconds through a commercially available tunnel oven with blowing of a hot air of 120° C. The film adhered closely to the notebooks without protrusion at sealed corner portions. Even if one end of the upper portion of the package was pushed lightly, the piled and packaged notebooks did not slip. The notebooks were tightly bound together and the package was in good packaging state suited for transportation.

The physical properties of the stretched films obtained in Examples 1 to 5 are shown in the following Table together with those of a commercially available low density polyethylene shrinkable film (made by Okura Kogyo Co.) (Comparative Example 1) and a film formed and stretched by means of a conventional blow-up process employing the same ethylene polymer as used in Example 2 (Comparative Example 2).

TABLE 1

|  | Ex. 1 | Ex. 2 | Ex. 3 | Ex. 4 | Ex. 5 | Com. Ex. 1 | Com. Ex. 2 |
| --- | --- | --- | --- | --- | --- | --- | --- |
| Thickness ($\mu$m.) | 21 | 21 | 19.8 | 35 | 25 | 40 | 30 |
| Haze (%) | 1.8 | 3.0 | 8.4 | 5.2 | 7.4 | 12.4 | 5.0 |
| Breaking strength (kg./cm.$^2$) | | | | | | | |
| MD | 500 | 850 | 900 | 1100 | 980 | 250 | 400 |
| TD | 450 | 800 | 720 | 100 | 710 | 230 | 380 |
| Elongation at breaking (%) | | | | | | | |
| MD | 150 | 200 | 220 | 140 | 160 | 430 | 640 |
| TD | 200 | 220 | 230 | 160 | 200 | 380 | 660 |
| Impact Strength (kg. · cm.) | 4.3 | 6.2 | 5.6 | 15.3 | 8.6 | 3.0 | 5.0 |
| Beads seal strength (g./10 mm. in width) | 830 | 850 | 900 | 1070 | 950 | 700 | 800 |
| Impact strength of beads sealed portion (kg. · cm.) | 3.8 | 8.0 | 5.5 | 9.0 | 5.7 | 3.0 | 4.0 |
| Bar heat seal strength (g./10 mm. in width) | 450 | 1100 | 900 | 1300 | 1030 | 850 | — |
| Impact strength of bar sealed portion (kg. · cm.) | 8 | 10 | 11 | 15 | 9 | 8 | — |
| Heat shrinkage percent (%) | | | | | | | |
| At 15° C. below melting point | (96° C.) | (109° C.) | (108° C.) | (108° C.) | (107° C.) | (100° C.) | (109° C.) |
| MD | 26 | 50 | 40 | 48 | 44 | 9 | 7 |
| TD | 28 | 50 | 46 | 45 | 48 | 7 | 5 |
| At 120° C. | | | | | | | |
| MD | 74 | 68 | 77 | 70 | 65 | 70 | 25 |
| TD | 62 | 62 | 60 | 62 | 62 | 65 | 20 |
| Heat shrinkage stress (kg./cm.$^2$) | | | | | | | |
| At 15° C. below melting point | (96° C.) | (109° C.) | (108° C.) | (108° C.) | (107° C.) | (100° C.) | (109° C.) |
| MD | 15 | 22 | 19 | 20 | 20 | 0.8 | 1.0 |
| TD | 15 | 20 | 17 | 25 | 22 | 0.5 | 0.8 |
| At 120° C. | | | | | | | |
| MD | 14 | 20 | 23 | 23 | 25 | 0.3 | 0.5 |
| TD | 11 | 20 | 17 | 21 | 23 | 0.3 | 0.5 |

(Note)
MD: Machine direction
TD: Transverse direction

As is clear from a comparison of Example 1 with Comparative Example 1 and a comparison of Example 2 with Comparative Example 2, the heat shrinkable film of the present invention has larger film strength, seal strength, impact strength and impact strength of sealed portion than the blown up, shrinkable films of polymers of the same kind, despite being thin. The excellent properties coupled with the improvement in transparency and heat shrinkability show that the film of the present invention has a large practical value.

What we claim is:

1. A heat shrinkable film which is a biaxially stretched film of a non-crosslinked ethylene polymer and which has a heat shrinkage percent of not less than 25% and a heat shrinkage stress of not less than 12 kg./cm.$^2$, respectively at a temperature of 15° C. below the melting point of the ethylene polymer and has a bar heat seal strength of not less than 900 g./10 mm. in width and an impact strength of beads sealed portion of not less than about 5 kg.cm., said ethylene polymer being a copolymer of ethylene and an $\alpha$-olefinically unsaturated monomer and having a density of 0.91 to 0.93 g./cm.$^3$ at 25° C.

2. The heat shrinkable film of claim 1, which is a stretched film of an ethylene polymer having a density of 0.91 to 0.93 g./cm.$^3$ at 25° C., a non-stretched film made of said ethylene polymer having a tensile strength at 300% elongation of not less than 15 kg./cm.$^2$ at a temperature of 15° C. below the melting point of said ethylene polymer.

3. The heat shrinkable film of claim 1, wherein said ethylene polymer is a copolymer of ethylene and not more than 25% by weight of an $\alpha$-olefin having 3 to 12 carbon atoms.

4. The heat shrinkable film of claim 1, wherein said ethylene polymer is a copolymer of ethylene and not more than 15% by weight of an $\alpha$-olefin having 4 to 6 carbon atoms.

* * * * *